(12) United States Patent
Yonemoto et al.

(10) Patent No.: US 12,006,229 B2
(45) Date of Patent: Jun. 11, 2024

(54) METHODS FOR PREPARING PARTICLES PRECURSOR, AND PARTICLE PRECURSOR PREPARED THEREBY

(71) Applicant: Microvast Power Systems Co., LTD., Huzhou (CN)

(72) Inventors: Bryan Yonemoto, Clearwater, FL (US); Xiao Zhang, Huzhou (CN)

(73) Assignee: MICROVAST ADVANCED MATERIALS INC., Lake Mary, FL (US)

( * ) Notice: Subject to any disclaimer, the term of this patent is extended or adjusted under 35 U.S.C. 154(b) by 859 days.

(21) Appl. No.: 17/043,649

(22) PCT Filed: Jun. 11, 2019

(86) PCT No.: PCT/CN2019/090779
§ 371 (c)(1),
(2) Date: Sep. 29, 2020

(87) PCT Pub. No.: WO2019/238052
PCT Pub. Date: Dec. 19, 2019

(65) Prior Publication Data
US 2021/0020913 A1    Jan. 21, 2021

Related U.S. Application Data

(60) Provisional application No. 62/683,042, filed on Jun. 11, 2018, provisional application No. 62/683,040, filed on Jun. 11, 2018.

(51) Int. Cl.
*H01M 4/1391* (2010.01)
*B01J 4/00* (2006.01)
(Continued)

(52) U.S. Cl.
CPC ............ *C01G 53/006* (2013.01); *B01J 4/008* (2013.01); *B01J 19/0086* (2013.01);
(Continued)

(58) Field of Classification Search
CPC .............. B01J 19/0086; B01J 2204/002; B01J 2219/00177; B01J 2219/00186;
(Continued)

(56) References Cited

U.S. PATENT DOCUMENTS 8,216,676 B2  7/2012  Paulsen et al.
9,406,930 B2  8/2016  Fukui et al.
(Continued)

FOREIGN PATENT DOCUMENTS

CN  102569773 A  7/2012
CN  102891309 A  1/2013
(Continued)

OTHER PUBLICATIONS

Gary M. Koenig, Jr., Ilias Belharouak, Haixai Deng, Yang-Kook Sun, Khalil Amine, "Composition-Tailored Synthesis of Gradient Transition Metal Precursor Particles for Lithium-Ion Battery Cathode Materials", Chemistry of Materials, Mar. 9, 2011, pp. 1954-1963, vol. 23, American Chemical Society.

*Primary Examiner* — Victoria H Lynch
(74) *Attorney, Agent, or Firm* — Cheng-Ju Chiang

(57) ABSTRACT

The present disclosure provides a method for preparing full-gradient particle precursors, and the full-gradient particle precursor prepared thereby. By controlling different types of anion compositions and/or cation compositions gradually changed to other types, and adjusting the pH to match with the species, precipitated particles are deposited to form a slurry, collecting the precipitated particle, treating with water, and drying to yield the particle precursor. After being washed and dried, the particle precursor is further
(Continued)

mixed with lithium source, after calcining to yield cathode active particles. The cathode active particles can be used to prepare cathode of lithium-ion battery.

20 Claims, 5 Drawing Sheets

(51) Int. Cl.
    *B01J 19/00*     (2006.01)
    *C01G 53/00*     (2006.01)
    *C01G 53/06*     (2006.01)
    *H01M 4/04*     (2006.01)
    *H01M 4/13*     (2010.01)
    *H01M 4/131*     (2010.01)
    *H01M 4/139*     (2010.01)
    *H01M 4/525*     (2010.01)
    *H01M 4/02*     (2006.01)
    *H01M 10/0525*     (2010.01)

(52) U.S. Cl.
    CPC .......... *C01G 53/06* (2013.01); *H01M 4/0497* (2013.01); *H01M 4/13* (2013.01); *H01M 4/131* (2013.01); *H01M 4/139* (2013.01); *H01M 4/1391* (2013.01); *H01M 4/525* (2013.01); *B01J 2204/002* (2013.01); *B01J 2219/00177* (2013.01); *B01J 2219/00186* (2013.01); *C01P 2002/52* (2013.01); *C01P 2004/03* (2013.01); *C01P 2004/84* (2013.01); *C01P 2006/40* (2013.01); *H01M 2004/028* (2013.01); *H01M 10/0525* (2013.01)

(58) Field of Classification Search
    CPC ........ B01J 4/008; C01G 53/006; C01G 53/04; C01G 53/06; C01P 2002/52; C01P 2004/03; C01P 2004/84; C01P 2006/40; H01M 10/0525; H01M 2004/028; H01M 4/0497; H01M 4/13; H01M 4/131; H01M 4/139; H01M 4/1391; H01M 4/366; H01M 4/505; H01M 4/525; Y02E 60/10
See application file for complete search history.

(56) References Cited

U.S. PATENT DOCUMENTS

| | | |
|---|---|---|
| 9,876,226 B2 | 1/2018 | Paulsen et al. |
| 2013/0202966 A1 | 8/2013 | Yu et al. |
| 2016/0072123 A1 | 3/2016 | Lang |
| 2016/0359165 A1 | 12/2016 | Kim et al. |
| 2017/0288262 A1 | 10/2017 | Choi et al. |

FOREIGN PATENT DOCUMENTS

| | | |
|---|---|---|
| CN | 103000876 A | 3/2013 |
| CN | 103236537 A | 8/2013 |
| CN | 103326016 A | 9/2013 |
| CN | 103794752 A | 5/2014 |
| CN | 103794783 A | 5/2014 |
| CN | 103811748 A | 5/2014 |
| CN | 104300117 A | 1/2015 |
| CN | 104779383 A | 7/2015 |
| CN | 105552327 A | 5/2016 |
| CN | 106207138 A | 12/2016 |
| CN | 106207140 A | 12/2016 |
| CN | 106797016 A | 5/2017 |
| CN | 107785551 A | 3/2018 |
| CN | 108140819 A | 6/2018 |
| EP | 3282506 A1 | 2/2018 |
| RU | 2408112 C1 | 12/2010 |
| RU | 2011148908 A | 6/2013 |
| WO | 2016/204563 A1 | 12/2016 |

METHODS FOR PREPARING PARTICLES PRECURSOR, AND PARTICLE PRECURSOR PREPARED THEREBY

TECHNICAL FIELD

The present disclosure relates to a method for preparing a lithium-ion battery cathode, particularly, to a method for preparing particle precursor which includes a gradient part of anions, and a particle precursor prepared by the method above.

BACKGROUND ART

The lithium-ion battery, originally commercialized in early 1990s, has come to dominate the energy storage market for hand-held, electronic consumer devices. This is because the battery is rechargeable and has high mass and volume energy density. Lithium-ion batteries are also being extensively investigated for electric vehicle applications currently. In electric vehicles, it is desirable that the battery cathode has high capacity, high power, improved safety, long cycle life, low toxicity and lower production costs. However, current cathode materials generally fail to meet all these requirements.

One reason why current cathode material fails to meet all the desired characteristics is that it is difficult to process complex multi-metal materials. As a matter of fact, one method suitable for processing certain transition-metal elements may not suit for processing other transition-metal elements which are desired to be integrated into the cathode particles. Hence, at such circumstance, other additives or agents would be needed to join the processing. For example, when preparing transition-metal precursor particles by a co-precipitation process, Ni—Mn—Co (abbr. NMC) is desired to be combined with aluminum (abbr. Al) to form the cathode precursor particles. However, Al would not precipitate homogeneously with the Ni—Mn—Co under conventional hydroxide processing conditions. Hence, complicated additives and complexing agents would have to be added into the reactor and join the reaction therein. This would bring the following disadvantages: first, the costs would be increased due to the feeding of the additives and complexing agents; second, removal of such additives and complexing agents would need extra work and would lead to waste of water.

When synthesizing NMC particles by such co-precipitation method, several anion species would inevitably exist therein, such as oxalate, carbonate and hydroxide. Generally, hydroxide is the most preferable anion when using the co-precipitation method in industry, since it yields high-density particles. Such high-density particles are beneficial for high energy density cells. However, the existence of such anions would do no good for the improvement of cathode electrochemical performance since they would lead to changes in porosity, crystallite size, or local atomic ordering. To achieve high electrochemical performance, it is desirable to select suitable processing conditions for certain cathode element (i.e., Al) combinations based on electrochemical differences of various co-precipitation anions.

However, the addition of Al into the metal hydroxide cathode precursor is challenging. The solubility product constant (Ksp) of Al is orders of magnitudes lower at the pH ranges typically of NMC based particles, which result in fast and excessive precipitation and unusual secondary particle growth. As examples, four conventional methods of depositing Al are described below.

U.S. Pat. No. 9,406,930B discloses a method to deposit NCA (abbr. Ni—Co—Al) compositions as a shell on a core of NMC nucleates, during which the pH value is adjusted to a lower value to facilitate the deposition of Al. As a matter of fact, the pH value of below 10 is suitable for Al deposition. However, in such method, the pH value is 12 to 14 at a reference liquid temperature of 25° C., much higher than 10. Hence, such method results in uneven Al deposition and needs long reaction time, which leads to greatly cumulated particle surface area. None of these is desirable.

U.S. Pat. No. 8,216,676B2 discloses a method in which Al is deposited on $LiCoO_2$, $LiMn_2O_4$ and NMC cathode active material particles. During which the ratio of Co to the transition metal is controlled to be greater than 50% while adjusting the pH near 9. As a result, the coating is only present on the particle surface, not within the particle during the deposition, which is performed on a final material. Hence, such method fails to integrate Al within the particle structure, especially for Ni-rich materials with little or no Co present.

U.S. Pat. No. 9,876,226B provides precursor cathode particles which are dry-coated with smaller alumina particles. Such method relies on Al ions to diffuse into the structure during heating. However, for Ni-rich cathode materials, high heat treatment would result in formation of inactive rock-salts, which degrades the cathode performance. Hence, it is typically not desirable.

CN106207140A discloses a method in which the aluminum (Al) is added during co-precipitation to NC (abbr. Ni—Co) materials at the existence of a special complexing agent or chelator. Such complexing agent brings complexity to the process, and results in additional treatment of waste water. The feeding of organic chelator would adversely affect the reaction time. However, such method fails to avoid using such complexing agent or chelator.

Meanwhile, another problem to achieve high electrochemical performance is that during the preparation of active material, water produced from hydroxide-based cathodes would cause corrosion to processing equipment, which may damage the cathode particle performance, since high water vapor contents are associated with large grains observed on the particles after calcination. Generally, one method to solve such problem is to increase the volumetric flowrates of the reaction gas within the reactor. However, it could only accelerate the removal rate, but fails to mitigate the water generation. Further, such method also increases production costs, and could not reduce the downstream corrosion. In fact, in some cases the corrosion may increase since more oxidative gas is used. On one hand, using much oxidative gas could promote the water removal, on the other hand, it could also increase the corrosion to the processing unit. Hence, removal of some water generation under the premise of not leading to corrosion is still not solved.

Further, there is still other problem remained unsolved for lithium-ion cathode materials. On one hand, since cobalt (abbr. Co) performs a dumbbell configuration due to the movement of its atoms, such configuration makes the movement of Ni/Li switching hard, which in turn block the migration path of the Ni and Li. Because of this, Co decreases the site exchange between the transition metals such as Ni to Li, and further benefit for better electrochemical performance. On the other hand, transition metal composition, such as Co, has a major influence on the costs since Co is the most expensive transition metal. Hence, it is desirable to abandon Co from the structure of cathode particles while improving the electrochemical performance simultaneously.

Technical Problem

First, it is difficult to add Al into metal hydroxide cathode precursor while achieving high electrochemical performance. Second, during the preparation of active particles, water produced from hydroxide-based cathodes would cause corrosion to the equipment. Third, Co is expensive which makes the cost much higher.

Technical Solution

The present disclosure provides a method for preparing full-gradient transitional metal particle precursor, the transition metal particle precursor may be combined with metals such as lithium to form cathode active particles which can be used for lithium-ion batteries.

The method includes at least the following steps: from an initial time $t_0$ to a first time ti, feeding stream (b) into a reactor for providing anion(s), simultaneously feeding stream (a) for providing cation(s), whereby the anion(s) and the cation(s) reacting to form a precipitated particle slurry; the stream (a) includes at least a first cation composition $A_1$, the stream (b) includes at least a first anion composition $B_1$ and a second anion composition $B_2$, both are fed simultaneously and the first anion composition $B_1$ is gradually switched to the second anion composition $B_2$ from the initial time $t_0$ to the first time $t_1$, $t_1$ comes after $t_0$, $t_0=0$; and filtering, and drying the precipitated particle slurry to yield the full-gradient particle precursor; the anion(s) provided by the stream (b) is at least one selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$, the cation(s) provided by the stream (a) is at least one selected from the group consisting of Mg, Ca, Zr, Ti, V, Cr, Mn, Fe, Co, Ni, Cu, Al, in a form of sulfate, carbonate, chloride, nitrate, fluoride, oxide, hydroxide, oxyhydroxide, oxalate, carboxylate, acetate, phosphate or borate.

Feeding stream (b) further includes the following steps: firstly, loading all the first anion composition $B_1$ into a container, which is connected with the reactor; secondly, starting to feed the second anion composition $B_2$ into the container with certain flowrate from the initial time to, and the first anion composition $B_1$ and the second anion composition $B_2$ forming a dynamic mixture solution, feeding the dynamic mixture solution into the reactor through the container from the initial time $t_0$ to a first time $t_1$, at the initial time $t_0$, the dynamic mixture fed into the reactor is mainly the first anion composition $B_1$, while at the first time $t_1$, the dynamic mixture is mainly the second anion composition $B_2$.

In one embodiment, the stream (a) comprises only one cation composition $A_1$, and a flowrate or concentration of the cation composition $A_1$ is constant from the initial time $t_0$ to the first time $t_1$.

In another embodiment, the stream (a) further includes a second cation composition $A_2$, the first cation composition $A_1$ is abruptly switched to the second cation composition $A_2$ at a switching time $t_s$, in which $t_s$ is between the initial time $t_0$ and the first time $t_1$.

In yet another embodiment, the stream (a) further comprises a second cation composition $A_2$, the first cation composition $A_1$ is gradually switched to the second cation composition $A_2$ from the initial time $t_0$ to the first time $t_1$.

The step that the first cation composition $A_1$ is gradually switched to the second cation composition $A_2$ from the initial time $t_0$ to the first time $t_1$ includes the following steps: firstly, loading all the first cation composition $A_1$ into a container; and then, starting to feed the second cation composition $A_2$ into the container at a certain flowrate from the initial time $t_0$ to form a dynamic mixture; and feeding the dynamic mixture into the reactor through the container from the initial time $t_0$ to the first time $t_1$, the dynamic mixture is mainly the first cation composition $A_1$ at the initial time to, mainly the second cation composition $A_2$ at the first time $t_1$. In one embodiment, the step that the first cation composition $A_1$ is gradually switched to the second cation composition $A_2$ from the initial time $t_0$ to the first time $t_1$ further includes the following steps: firstly, loading all the first cation composition $A_1$ into a container; and then, starting to feed the second cation composition $A_2$ into the container at a certain flowrate from the initial time $t_0$ to form a dynamic mixture; and feeding the dynamic mixture into the reactor through the container from the initial time $t_0$ to the first time $t_1$, the dynamic mixture is mainly the first cation composition $A_1$ at the initial time to, mainly the second cation composition $A_2$ at the first time $t_1$.

In one embodiment, the stream (b) further includes a third anion composition $B_3$, which is at least one selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$; the method further includes the following steps: feeding the second anion composition $B_2$ and the third anion composition $B_3$ from the first time $t_1$ to a second time $t_2$, $t_2$ comes after $t_1$, the second anion composition $B_2$ is gradually switched to the third anion composition $B_3$ from the first time $t_1$ to the second time $t_2$; feeding the stream (a) for providing cation(s) simultaneously from the first time $t_1$ to the second time $t_2$, the stream (a) includes at least the first cation composition $A_1$.

At the first time $t_1$, as show in FIG. 11, the container for holding the anion solution $B_1$ is filled with the second anion composition $B_2$ or is mainly filled with the second anion composition $B_2$ and small amount of the first anion composition $B_1$, the container for holding the anion solution $B_1$ is connected with the reactor; the step that the second anion composition $B_2$ or the second anion composition $B_2$ with small amount of the first anion composition $B_1$ is gradually switched to the third anion composition $B_3$ from the first time $t_1$ to the second time $t_2$ includes the following steps: starting to feed the third anion composition $B_3$ into the container for holding anion solution $B_1$ with certain flowrate from the first time $t_1$, then the second anion composition $B_2$ or the second anion composition $B_2$ with small amount of the first anion composition $B_1$, and the third anion composition $B_3$ forming a dynamic mixture solution; feeding the dynamic mixture solution into the reactor through the container for holding anion solution $B_1$ from the first time $t_1$ to a second time $t_2$, at the first time $t_1$, the dynamic mixture fed into the reactor is mainly the second anion composition $B_2$, while at the second time $t_2$, the dynamic mixture is mainly the third anion composition $B_3$.

In another embodiment as shown in FIG. 12, there are three containers connected in series for holding anion solution $B_1$ (container 1), anion solution $B_2$ (container 2) and anion solution $B_3$ (container 3) separately, and container 1 is connected to the reactor. Before reaction, each container has hold a certain amount anions, at the initial time to, $B_1$ flows into the reactor with a stable flowrate, $B_2$ flows from container 2 into container 1 at a stable flow rate from the initial time $t_0$ to the first time $t_1$, and $B_3$ flows from container 3 into container 2 at a stable flowrate from the first time $t_1$ to the second time $t_2$. In this situation, $B_3$ feeding $B_2$ then $B_2$ feeding $B_1$ is a possible at a stable flow rate. As the various containers with anion initial anion compositions $B_1$, $B_2$ and $B_3$ become a dynamic mixture through contacting one another, the dynamic mixture can be fed to the reactor to create a concentration gradient in the precipitating particles.

In one embodiment, the stream (a) further includes a second cation composition $A_2$, the method further includes the following step: feeding the first cation composition $A_1$ and a second cation composition $A_2$ from the first time $t_1$ to the second time $t_2$, during which the first cation composition $A_1$ is gradually switched to the second cation composition $A_2$.

The container is filled with the first cation composition $A_1$ at the first time $t_1$, the step the first cation composition $A_1$ is gradually switched to the second cation composition $A_2$ includes the following steps: starting to feed the second cation composition $A_2$ into the container with certain flowrate from the first time $t_1$, the first cation composition $A_1$ and the second cation composition $A_2$ forming a dynamic mixture solution; and feeding the dynamic mixture solution into the reactor through the container from the first time $t_1$ to a second time $t_2$, at the first time $t_1$, the dynamic mixture fed into the reactor is mainly the first cation composition $A_1$, while at the second time $t_2$, the dynamic mixture is mainly the second cation composition $A_2$.

The present disclosure further provides a full-gradient particle precursor prepared by the method above, having a formula $(Ni_xMn_yCo_zMe_{1-x-y-z})(CO_3)_a(OH)_{2-2a}$ where $x+y+z \geq 0.9$, $z \leq 0.2$, $0 \leq a \leq 1$, Me is at least one additional metal element selected from the group consisting of Mg, Ca, Zr, Ti, V, Cr, Fe, Cu and Al; the particle precursor includes a first gradient part, which is made of co-precipitation of anions including a first anion composition $B_1$ and a second anion composition $B_2$ and cation(s) including at least a first cation composition $A_1$, the first anion composition $B_1$ is gradually switched to the second anion composition $B_2$ from inner to outer.

In one embodiment, the cation(s) further includes a second cation composition $A_2$, the first gradient part is divided into a center part and a periphery part enwrapping the center part, the center part includes the first cation composition $A_1$, the shell includes the second cation composition $A_2$.

In another embodiment, the cation(s) in the first gradient part further includes a second cation composition $A_2$, the first cation composition $A_1$ is gradually switched to the second cation composition $A_2$ within the first full-gradient part from inner to outer.

In one embodiment, the full-gradient particle precursor further includes a second gradient part enwrapping the first gradient part, the second gradient part is made of co-precipitation of anions including the second anion $B_2$ and a third anion $B_3$ and cation(s) including at least the first cation composition $A_1$, in which the second anion composition $B_2$ is gradually switched to the third anion $B_3$.

In another embodiment, the second gradient part further includes a second cation composition $A_2$, the first cation composition $A_1$ is gradually switched to the second cation composition $A_2$ within the second gradient part from inner to outer.

Advantageous Effects

The method of the present disclosure has the following advantages: Firstly, solids with different cation-anion pairings have different equilibrium solubilities, as is tested by the solubility constant Ksp. During precipitation, the Ksp value is the thermodynamic limit of metal ions precipitating out of solution, with different anions and pH having an influence. By adjusting the solution pH and anion, the precipitations possible and the stability of said cations in the solid form is adjusted, which is desirable for cathode precursor particles to better control the selection of dopants available for use during a co-precipitation reaction. Hence, the transitional-metal dopants except Co, Mn, and Ni that are incompatible with the core anion species under the processing conditions can be easily added to the particle precursor in the shell, and vice versa.

Particularly, $Al^{3+}$ can be added to the particle precursor during the co-precipitation under the premise that there is hydroxide in the solution which can form precipitation with $Al^{3+}$; in such conditions, no additional organic chelating additives are needed to remove $Al^{3+}$, and the precipitation kinetics are avoided to be slowed in the absence of chelating agents. Because of this, Ni-rich particles precursor can have Al dopant into the particle without using organic chelating additives, the Ni-rich particles precursor has a mole ratio of Ni to transitional metals higher than 0.7. The concentration of $Al^{3+}$ deposited into the particles can be adjusted based on the time feeding the $Al^{3+}$ dopants and the time when switching the anions.

Secondly, since the particle precursor is full-gradient, the concentration gradient of the anion species ensures that there is smooth transition between different anion species. The transition between composition typically requires a concurrent adjustment of the pH with the reactor, the solution pH can more manageably be charged as the concentration of the anion changes.

Thirdly, due to the feeding of elements Ni, Mn, Al etc. into the reaction, the cobalt content will be below 20% of the total transition metal ratio, and preferably below 5%, and more preferably 0% cobalt will be present in the cathode precursor particle. Because of this, the cost is greatly decreased.

Fourthly, during calcination, anions of $CO_3$ or $C_2O_4$ would evolve $CO/CO_2$ gas, which makes non-homogeneous porosity within the particles. Since the concentration of the anions are gradually changed, the porosity within the particles would also be gradually increased, especially near the surface of the particles. Hence, the material may have improved transport properties during high rate electrochemical testing. Fifthly, the content of water evolved from the cathode particle precursor and Li source will be decreased when an anion composition gradient material is prepared, because $CO/CO_2$ will be evolved partially instead of $H_2O$ during the decomposition reactions.

MODE FOR THE INVENTION

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the embodiments below, full-gradient particle precursors which includes at least one gradient part is prepared by a co-precipitation reaction, and the solution volume where the reaction takes place is defined as a precipitation zone. The at least one gradient part starts to be formed along with the co-precipitation.

The method for preparing such full-gradient particle precursors includes the following steps: firstly, vacuuming the precipitation zone and/or filling with He, $N_2$ or Ar gas, for example, blanketing or bubbling the precipitation zone by He, $N_2$ or Ar gas.

Next, introducing stream (b) into a reactor for providing precipitating anions, feeding stream (a) for providing transitional-metal cations, whereby the precipitating anions and the transitional-metal cations reacting to form a precipitated particle slurry. In this step, the stream (a) includes at least one cation composition; the stream (b) includes at least a first anion composition $B_1$ and a second anion composition $B_2$, which are fed simultaneously, and concentrations of both the first anion composition $B_1$ and the second anion composition $B_2$ is gradually changed from an initial time to to a first time $t_1$, in which $t_1$ comes after $t_0$. The initial time $t_0$ refers to a time when the co-precipitation initially occurs, $t_0=0$.

Finally, filtering and drying the precipitated particle slurry to yield the full-gradient particle precursor.

Particularly, the feeding of stream (b) is as follows: firstly, loading all the first anion composition $B_1$ into a container; secondly, starting to feed the second anion composition $B_2$ into the container with certain flowrate at the initial time $t_0$, and the first anion composition $B_1$ and the continuously fed second anion composition $B_2$ forming a dynamic mixture solution, feeding the dynamic mixture solution into the reactor through the container from the initial time $t_0$ to a first time $t_1$. At the first time $t_1$, the dynamic mixture includes mainly the second anion composition $B_2$.

In one embodiment, the first anion composition $B_1$ includes hydroxide anion, a content of the hydroxide anion in the stream (b) is no less than 80 wt %. The second anion composition $B_2$ includes carbonate anion and/or oxalic anion, a content of the carbonate and/or oxalic anions is no less than 40 wt % in the steam (b).

Figure 1:
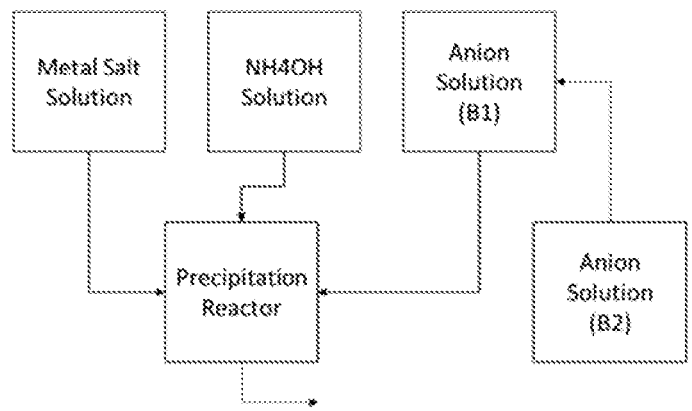
FIG. 1 shows a schematic view of the reaction device to form the full-gradient particle precursors in one embodiment of the present disclosure.

FIG. 1 shows a flow diagram of the anion gradient process of the method above in one embodiment. As shown in FIG. 1, in such embodiment, the first anion composition $B_1$ is fed through a container directly to the reactor, while the second anion composition $B_2$ is continuously fed into the container and mixed with the first anion composition $B_1$ to form a dynamic mixture, and then the dynamic mixture is further fed through the container into the reactor. Preferably, the flowrate of the dynamic mixture fed into the reactor is kept constant. Hence, in such embodiment, as the second anion composition $B_2$ flows into the container, the total volume of the dynamic mixture in container $B_1$ is gradually changed. In a preferred embodiment the flowrate of container $B_2$ into container $B_1$ is preferably less than the flowrate of container $B_1$ into the reactor, and container $B_2$ volume reaches zero at the same time container $B_1$ volume reaches zero. In a more preferred embodiment container $B_1$ and $B_2$ have equal volume when $B_2$ begins feeding to $B_1$, and the flowrate of container $B_2$ into $B_1$ is half the flowrate of container $B_1$ into the reactor. Under all flowrates the concentrations of both the first anion composition $B_1$ and the second anion composition $B_2$ are gradually changed.

Figure 2:
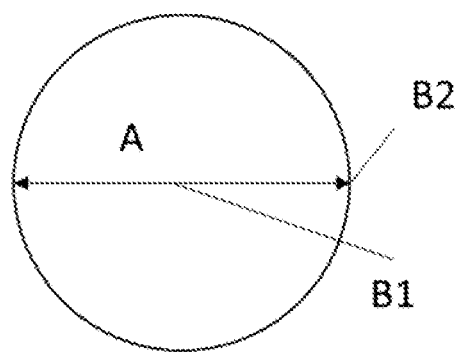
FIG. 2 shows a schematic view of a full-gradient particle precursor of a first example, which is made of a first gradient part, the first gradient part includes a first anion composition $B_1$ and a second anion composition $B_2$, in which the first anion composition $B_1$ is gradually switched to the second anion composition $B_2$, meanwhile the first gradient part further includes a first cation $A_1$ which is constant therein.
Figure 3:
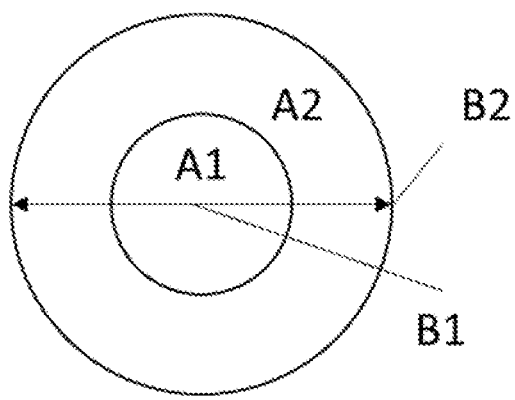
FIG. 3 shows a schematic view of a full-gradient particle precursor of a second example, which is made of a first gradient part, the first gradient part includes a first anion composition $B_1$ and a second anion composition $B_2$, in which the first anion composition $B_1$ is gradually switched to the second anion composition $B_2$, meanwhile the first gradient part is also divided into a center part and a periphery part enwrapping the center part, the center part further includes a uniform first cation composition $A_1$, the shell further includes a uniform second cation composition $A_2$.
Figure 4:
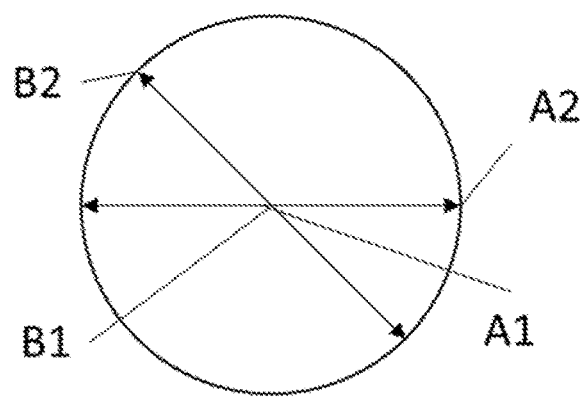
FIG. 4 shows a schematic view of a full-gradient particle precursor of a third example, which is made of a first gradient part, the first gradient part includes a first anion composition $B_1$ and a second anion composition $B_2$, in which the first anion composition $B_1$ is gradually switched to the second anion composition $B_2$, meanwhile, the first gradient part further includes a first cation composition $A_1$ and a second cation composition $A_2$, in which the first cation composition $A_1$ is gradually switched to the second cation composition $A_2$.

The method above produces a full-gradient particle precursor, which includes at least a first gradient part, as shown in FIGS. 2-4. The first gradient part includes the first anion $B_1$ and the second anion $B_2$. A content of the first anion composition $B_1$ in the particle precursor is gradually decreased from its maximum to its minimum while that of the second anion composition $B_2$ is gradually increased from its minimum to its maximum from the initial time $t_0$ to the first time $t_1$. Since $t_0$ is initial time when the co-precipitation occurs, the first gradient part forms a core of the particle precursor, as shown in FIGS. 2-4.

Particularly, in the first embodiment, as shown in FIG. 2, the full-gradient particle precursor is made of the first gradient part. The first gradient part includes a first anion composition $B_1$ and a second anion composition $B_2$, in which the first anion composition $B_1$ is gradually switched to the second anion composition $B_2$, meanwhile the first gradient part further includes a first cation $A_1$ which is constant therein.

In the second embodiment, as shown in FIG. 3, the full-gradient particle precursor is made of a first gradient part, the first gradient part includes a first anion composition $B_1$ and a second anion composition $B_2$, in which the first anion composition $B_1$ is gradually switched to the second anion composition $B_2$, meanwhile the first gradient part is also divided into a center part and a periphery part enwrapping the center part, the center part further includes a uniform first cation composition $A_1$, the shell further includes a uniform second cation composition $A_2$.

In the third embodiment, as shown in FIG. 4, the full-gradient particle precursor is made of a first gradient part, the first gradient part includes a first anion composition $B_1$ and a second anion composition $B_2$, in which the first anion composition $B_1$ is gradually switched to the second anion composition $B_2$, meanwhile, the first gradient part further includes a first cation composition $A_1$ and a second cation composition $A_2$, in which the first cation composition $A_1$ is gradually switched to the second cation composition $A_2$.

Optionally, during the method for preparing the full-gradient particle precursor, additional streams may also be introduced into the reactor to add additional species to the reaction, or to remove solvent through an in-situ thickening device.

Optionally, in one embodiment, the stream (b) further includes a third anion composition $B_3$, which are fed for a portion of the reaction time from the first time $t_1$ to a second time $t_2$. The method is similar to FIG. 1, except in one option container $B_2$ is fed to container $B_1$ for a period of time $t_0$ to $t_1$, and then a new container with composition $B_3$ begins feeding to container $B_1$. Another way to implement composition $B_3$ into the reaction system is to have container $B_3$ flow into container $B_2$ for a period of time $t_1$ to $t_2$, and preferably the container of $B_3$, $B_2$ and $B_1$ should all reach zero solution volume at time $t_2$. As the various containers with anion initial anion compositions $B_1$, $B_2$ and $B_3$ become a dynamic mixture thru contacting one another, the dynamic mixture can be fed to the reactor to create a concentration gradient in the precipitating particles.

Because of this feed manner, the contribution of anions from the third composition $B_3$ is at a minimum at the first time $t_1$ and gradually increased to a maximum at the second time $t_2$. The first time $t_1$ refers to a time when the first gradient part has been formed and a second gradient part starts to be formed. The first and second gradient portion preferably have a different rate of change to the anion ratios over time (ie two distinct slopes before and after $t_1$) if no new anion species are added with composition $B_3$ to the dynamic mixture being fed to the reactor. From the first time $t_1$ to the second time $t_2$, the second gradient part is formed which enwraps the first gradient part, as shown in FIGS. 5-6, the second gradient part includes the second anion $B_2$ and the third anion $B_3$.

Figure 5:
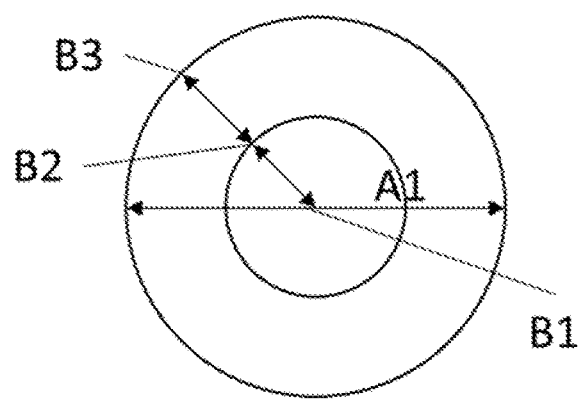
FIG. 5 shows a schematic view of a full-gradient particle precursor of a fourth example, which is made of a first gradient part and a second gradient part enwrapping the first gradient part, the first gradient part includes a first anion $B_1$ and a second anion $B_2$, in which the first anion $B_1$ is gradually switched to the second anion $B_2$; the second gradient part includes the second anion $B_2$ and a third anion $B_3$, in which the second anion $B_2$ is gradually switched to the third anion $B_3$.
Figure 6:
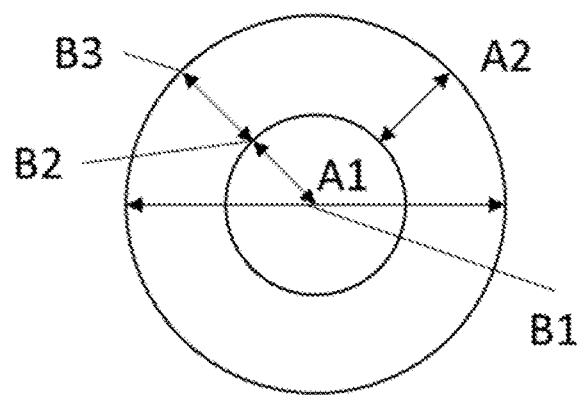
FIG. 6 shows a schematic view of a full-gradient particle precursor of a fifth example, which includes a first and a second gradient parts, the first gradient part includes a first anion $B_1$ and a second anion $B_2$, in which the first anion $B_1$ is gradually switched to the second anion $B_2$; the second gradient part includes the second anion $B_2$ and a third anion $B_3$, in which the second anion $B_2$ is gradually switched to the third anion $B_3$.

In the above embodiment as shown in FIGS. 5-6, the first time $t_1$ is greater than 50% of the whole reaction time. In another embodiment, the first time $t_1$ is after 75% of the whole reaction time.

Particularly, in one embodiment, as shown in FIG. 5, the full-gradient particle precursor is made of a first gradient part and a second gradient part enwrapping the first gradient part. The first gradient part includes a first anion $B_1$ and a second anion $B_2$, in which the first anion $B_1$ is gradually switched to the second anion $B_2$; the second gradient part includes the second anion $B_2$ and a third anion $B_3$, in which the second anion $B_2$ is gradually switched to the third anion $B_3$. Meanwhile, both the first gradient part and the second gradient part include a first cation composition $A_1$ which is constant.

In another embodiment, as shown in FIG. 6, the full-gradient particle precursor is made of a first gradient part and a second gradient part enwrapping the first gradient part. The first gradient part forms a core, which includes a first anion $B_1$ and a second anion $B_2$, in which the first anion $B_1$ is gradually switched to the second anion $B_2$; the second gradient part forms a shell enwrapping the first gradient part, which includes the second anion $B_2$ and a third anion $B_3$, in which the second anion $B_2$ is gradually switched to the third anion $B_3$. Meanwhile, the first gradient part further includes a constant first cation composition $A_1$, and the second gradient part further includes the first cation composition $A_1$ and a second cation composition $A_2$, in which the first cation composition $A_1$ is gradually switched to the second cation composition $A_2$.

In the process of the present disclosure, the concentration of the anions in stream (b) is 0.001-14 (mol anion/L). The at least one anion composition $B_i$ (where i represents for 1, 2, 3 . . .), i.e., $B_1$, $B_2$ or $B_3$ is selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$ or some combination of the species listed above. Meanwhile, the stream (b) functions to provide anions which would enter the precipitation particles. In one embodiment, in the stream (b), the first anion composition $B_1$ includes hydroxide anion, and the content of hydroxide in the stream (b) is no less than 80 wt %, the second anion composition $B_2$ includes carbonate anion ($CO_3^{2-}$) and/or oxalate anion ($C_2O_4^{2-}$), a content of the carbonate anion and/or oxalate anion in stream (b) is no less than 40 wt %.

Further, the present disclosure provides a method for preparing cathode active particles, after yielding the particle precursors, the method further includes the following steps: mixing the particle precursors with a lithium source to form a mixture, and calcining to yield cathode active particles. During such calcination, lithiation reaction occurred and water removed from the mixture. The prepared cathode active particles can be used in cathode.

Each precipitation zone volume is defined as the volume of a single mixed vessel or the sum of several processing vessels, pumps, or solid-liquid thickening devices connected in parallel.

The precipitation zone can generally be described by the following mass balance equation: $d(\rho_c V)/dt = \Sigma_{\alpha=a}^{z} F_{\alpha=a} \rho_\alpha$, where "$\alpha$" represents for the inlet/outlet streams (a) to (z), "$\rho_\alpha$" represents for a fluid density, "V" refers to a volume of the precipitation zone, "$F_\alpha$" refers to a flowrate of the volumetric, "$\rho_\alpha$" is a density of inlet streams; "$\rho_c$" is a density of accumulating fluid in the reactor which changes with time.

In one embodiment, only one precipitation zone is used, and the co-precipitation reactions occur during batch operation, the mass balance equation is defined as $d(\rho_c V)/dt \neq 0$.

In another embodiment, multiple precipitation zones are linked in series, $d(\rho_c V)/dt \neq 0$.

In still another embodiment, multiple precipitation zones are linked in series, $d(\rho_c V)/dt = 0$.

In the present disclosure, the cathode active particles are concentration gradient materials produced by a co-precipitation reaction, size of the cathode active particles is proportional to the reaction time, and the composition deposited onto a particle at a particular time is directly related to the inlet ion compositions.

Due to the feeding manner and sequence, the anions deposited into the particle slurry would be gradually changed with different anions.

As mentioned above, the particle precursor prepared by the method above includes the first gradient part. In one embodiment, the first gradient part forms the whole particle precursor, as shown in FIGS. 2-4. In another embodiment, the first gradient part is the core, locating in the center of the whole particle precursor, as shown in FIGS. 5-6. The first gradient part as shown in either of FIGS. 2-6 includes a first anion composition $B_1$ and a second anion composition $B_2$ whose content in the first gradient part gradually changed. In detail, from inner to outer, the content of the first anion composition $B_1$ is gradually decreased from its maximum to its minimum while that of the second anion composition $B_2$ is gradually increased from its minimum to its maximum, in other words, the first anion composition $B_1$ is gradually switched to the second composition $B_2$ from inner to outer.

Optionally, the particle precursor further includes the second gradient part locating outside the first gradient part, enwrapping the first gradient part, as shown in FIGS. 5 and 6, meanwhile, an interface is formed between the first and second gradient parts. The second gradient part includes both the second anion composition $B_2$ and the third anion composition $B_3$, whose contents in the second gradient part are both gradually changed from inner to outer, while at the interface, the content of the second anion composition $B_2$ is the same. Within the second gradient part outside the interface, the content of the second anion composition $B_2$ is gradually decreased from its maximum to its minimum while that of the third anion composition $B_3$ is gradually increased from its minimum to its maximum.

Please note that in the particle precursor product, the "first anion composition $B_1$", "second anion composition $B_2$" and "third anion composition $B_3$" refers to the anion precipitated therein. Meanwhile, when illustrating the method, the "first anion composition $B_1$", "second anion composition $B_2$" and "third anion composition $B_3$" refers to the salts containing the anions mentioned.

The instantaneous anion composition B being fed into the co-precipitation zone during the gradient portion, for example from t0 to $t_e$ in the embodiment above, can be described as:

$$B = \frac{B_i V_i + (F_{B2} B2 - B_i F_B)(t_{i+1} - t_i)}{V_{i+1}},$$

where $V_1$ is the volume of feed solvent that starts as the first anion composition $B_1$ continuously altered by the second anion composition $B_2$; $F_{B2}$ is the flowrate of the second anion composition solution $B_2$ into the reactor, and t is the time of the reaction.

In one embodiment, the first anion composition $B_1$ is a solution entirely configured from hydroxide salts. In another embodiment, the second anion composition $B_2$ includes [$CO_3$] salts, [$C_2O_4$] salts, [OH] salts, or some combination of the species listed. In still another embodiment, the third anion composition $B_3$ includes [$CO_3$] salts, [$C_2O_4$] salts, [OH] salts, or some combination of the species.

In the present disclosure, the concentration of stream (b) is gradually changed during the reaction, as shown in FIGS. 2-4.

In the embodiment of FIG. 5, the first anion composition $B_1$ and the second anion composition $B_2$ are co-precipitated with a cation $A_1$ to form the core. The second anion composition $B_2$ and the third anion composition $B_3$ are co-precipitated with the same cation $A_1$ to form the shell enwrapped the core.

With regard to the cations, in the present disclosure, stream (a) functions to provide transitional-metal cations. Stream (a) has at least one cation composition species. In one embodiment, for example, as shown in FIGS. 2 and 5, stream (a) only has one cation, i.e., a first cation composition $A_1$. In another embodiment, for example, as shown in FIGS. 3-4 and 6, the stream (a) has a first cation composition $A_1$ and a second cation composition $A_2$.

Stream (a) includes the cations for precipitation with a concentration from 0.001-6 mol cation/L. The cations provided by stream (a) is at least one selected from the group consisting of Mg, Ca, Zr, Ti, V, Cr, Mn, Fe, Co, Ni, Cu, Al or some combination of the species listed above. The cation(s) provided by stream (a) is in a form of sulfate, carbonate, chloride, nitrate, fluoride, oxide, hydroxide, oxyhydroxide, oxalate, carboxylate or acetate, phosphate or borate. For example, in one embodiment, stream (a) is Ni:Mn:Co 4:3:3 metal salt. In another embodiment, the stream includes Ni:Co:Mn 4:4:2 metal hydroxide and Ni:Co 9:1 metal salt.

In one embodiment, the stream (a) has only one cation composition $A_1$ during the co-precipitation process, as shown in FIGS. 2 and 5.

In another embodiment, as shown in FIG. 3, the stream (a) has a first cation composition $A_1$ and a second cation composition $A_2$. During the co-precipitation of $B_1$ and $B_2$ from the initial time $t_0$ to the first time $t_1$, the step of feeding the stream (a) further includes the following steps, in which $t_0$ is a time when the co-precipitation of $B_1$ and $B_2$ starts, ti is the time when the co-precipitation ends. Firstly, feeding the first cation composition $A_1$ from the initial time $t_0$ to an abruptly switching time $t_s$, during which the concentration of the first cation composition $A_1$ is constant, the anions $B_1$ and $B_2$ reacting with the first cation $A_1$ separately to form deposition. The deposition in this stage forms a core structure. At the abruptly switching time $t_s$, the first cation composition $A_1$ is abruptly switched to the second cation composition $A_2$.

And then, feeding the second cation composition $A_2$ from the abruptly switching time $t_s$ to the first time $t_1$, during which the concentration of the second cation composition $A_2$ is constant, and the anions $B_1$ and $B_2$ reacting with the second cation $A_2$ separately to form deposition, the deposition in this stage forms a shell structure enwrapping the core.

As shown in FIG. 3, the full-gradient particle precursor is made of the first gradient part, which includes a first anion composition $B_1$ and a second anion composition $B_2$ whose contents in the first gradient part are gradually changed. In detail, from inner to outer, the first anion composition $B_1$ is gradually switched to the second composition $B_2$. Meanwhile, the first gradient part is further divided into a center part and a periphery part, the center part is made of co-precipitations formed by the first and second anion compositions $B_1$ and $B_2$ reacting with the first cation composition $A_1$, and the periphery part is made of co-precipitations formed by the first and second anion composition $B_1$ and $B_2$ reacting with the second cation composition $A_2$.

In still another embodiment, as shown in FIG. 4, the stream (a) has a first cation composition $A_1$ and a second cation composition $A_2$. When feeding the stream (b), at the same time feeding the first cation composition $A_1$ and the second cation composition $A_2$ from the initial time $t_0$ to the first time $t_1$. During the initial time $t_0$ to the first time $t_1$, the first cation composition $A_1$ is gradually switched to the second cation composition $A_2$. To realize the gradually switching, the step that the first cation composition $A_1$ is gradually switched to the second cation composition $A_2$ from the initial time $t_0$ to the first time $t_1$ further includes the following steps: firstly, loading all the first cation composition $A_1$ into a container; and then, starting to feed the second cation composition $A_2$ into the container at a certain flowrate from the initial time $t_0$ to form a dynamic mixture; and feeding the dynamic mixture into the reactor through the container from the initial time $t_0$ to the first time $t_1$, the dynamic mixture is mainly the first cation composition $A_1$ at the initial time to, mainly the second cation composition $A_2$ at the first time $t_1$.

In such embodiment, from the initial time $t_0$ to the first time $t_1$, the first cation composition $A_1$ is gradually changed to the second cation composition $A_2$; the first anion composition $B_1$ is gradually changed to the second anion composition $B_2$. Because of this, during the time period from the initial time $t_0$ to the first time $t_1$, the both the anions and the cations are full-gradient.

In yet another embodiment, as shown in FIG. 5, the stream (a) has only a first cation composition $A_1$ which is constant during the time period from the initial time $t_0$ to the second time $t_2$. During such period, the first anion composition $B_1$ is gradually switching to the second anion composition $B_2$ from the initial time $t_0$ to the first time ti, and the second anion composition $B_2$ is gradually switching to the third anion composition $B_3$ from the first time $t_1$ to the second time $t_2$. Particularly, at the first time $t_1$, the container is filled with the second anion composition $B_2$, the container is connected with the reactor; the step that the second anion composition $B_2$ is gradually switched to the third anion composition $B_3$ from the first time $t_1$ to the second time $t_2$ comprises the following steps: starting to feed the third anion composition $B_3$ into the container with certain flowrate from the first time $t_1$, the second anion composition $B_2$ and the third anion composition $B_3$ forming a dynamic mixture solution; and feeding the dynamic mixture solution into the reactor through the container from the first time $t_1$ to a second time $t_2$, at the first time $t_1$, the dynamic mixture fed into the reactor is mainly the second anion composition $B_2$, while at the second time $t_2$, the dynamic mixture is mainly the third anion composition $B_3$.

In still another embodiment, as shown in FIG. 6, the stream (a) has a first cation composition $A_1$ and a second cation composition $A_2$, during the step feeding the first anion composition $B_1$ and the second anion composition $B_2$ from the initial time $t_0$ to the first time $t_1$, simultaneously feeding the first cation composition $A_1$ into the reactor which has a constant concentration and/or flowrate. During the step feeding the second anion composition $B_2$ and the third anion composition $B_3$ from the first time $t_1$ to a second time $t_2$, feeding the first cation composition $A_1$ and the second cation composition $A_2$ into the reactor, in which the first cation composition $A_1$ is gradually switched to the second cation composition $A_2$. Particularly, at the first time $t_1$, the container is filled with the first cation composition $A_1$, the step the first cation composition $A_1$ is gradually switched to the second cation composition $A_2$ comprises the following steps: starting to feed the second cation composition $A_2$ into the container with certain flowrate from the first time $t_1$, the first cation composition $A_1$ and the second cation composition $A_2$ forming a dynamic mixture solution; and feeding the dynamic mixture solution into the reactor through the container from the first time $t_1$ to a second time $t_2$, at the first time $t_1$, the dynamic mixture fed into the reactor is mainly the first cation composition $A_1$, while at the second time $t_2$, the dynamic mixture is mainly the second cation composition $A_2$.

As illustrated above, in one embodiment, the cation composition changes from the first composition $A_1$ to the second composition $A_2$ gradually during the co-precipitation period. In another embodiment, the cation composition changes from the first composition $A_1$ to the second composition $A_2$ abruptly.

In one embodiment, there is only one cation composition species in stream (a) fed into the reactor from the beginning to the end. In another embodiment, the cation composition changes from the first composition $A_1$ to the second composition $A_2$ for feeding different transitional-metal combinations.

Further, the first cation composition $A_1$ and the second cation composition $A_2$ has a cation ratio of $Ni_xMn_yCo_zMe_{1-x-y-z}$, where $x+y+z\geq0.9$, $z\leq0.2$, and "Me" refers to one or more additional metal elements selected from the group consisting of Mg, Ca, Zr, Ti, V, Cr, Fe, Cu and Al. In one embodiment, $z<0.05$. In another embodiment, $z=0$. In another embodiment, "Me" is Al, Mg, Zr, Ti or some combination of the species listed above.

Under the feed conditions discussed above, a precipitated particle slurry will be collected after the co-precipitation is finished, after being treated, the particle slurry is treated to yield the particle precursor. The particle precursor is expressed as $(Ni_xMn_yCo_zMe_{1-x-y-z})(CO_3)_a(OH)_{2-2a}$ where $x+y+z\geq0.9$, $z\leq0.2$, $0\leq a\leq1$, "Me" is additional metal elements except Ni, Mn and Co, such as Mg, Ca, Zr, Ti, V, Cr, Fe, Cu and Al.

In some embodiments, the first cation composition $A_1$ and the second cation composition $A_2$ are different. In such embodiments, the first cation composition $A_1$ has a cation ratio of $Ni_xMn_yCo_zMe_{1-x-y-z}$, where $x+y+z\geq0.9$, $0.75\leq x\leq1$; $0\leq z\leq0.1$, "Me" refers to one or more additional metal elements selected from the group consisting of Mg, Ca, Zr, Ti, V, Cr, Fe, Cu and Al. The second cation composition $A_2$ has a cation ratio of $Ni_xMn_yCo_zMe_{1-x-y-z}$ where $x+y+z\geq0.9$, $0.3\leq x\leq0.7$; $0.25\leq y\leq0.5$, "Me" refers to one or more additional metal elements selected from the group consisting of Mg, Ca, Zr, Ti, V, Cr, Fe, Cu and Al.

In one embodiment, by changing the composition of stream (a), cation composition would be changed continuously for all or part of the material, thus forming a cathode whose cation is made of concentration gradient transitional-metals. In one embodiment, the transitional-metals, i.e., the cations, change during the whole process for preparing the entire particle. In another embodiment, only a portion of the particle make linear gradient shell transitional-metal particles with a core-shell anion species, others remain same. In still another embodiment, only a portion of the particle make non-linear gradient shell transitional-metal particles with a core-shell anion species. In yet another embodiment, only a portion of the particle make multi-slope gradient shell transitional-metal particles with a core-shell anion species. In still another embodiment, only a portion of the particle make core-gradient shell transitional-metal particles with a core-shell anion species. In yet another embodiment, only a portion of the particle make core-gradient-shell transition metal particles with a core-shell anion species.

In some embodiments, to yield the full concentration gradient particle precursor, the transitional-metal feed, i.e., the stream (a) which provides the first cation composition $A_1$ and the second cation composition $A_2$ has a cation ratio of $Ni_xMn_yCo_zMe_{1-x-y-z}$, where $x+y+z\geq0.9$, $z\leq0.2$, "Me" refers to one or more additional metal elements selected from the group consisting of Mg, Ca, Zr, Ti, V, Cr, Fe, Cu and Al, the first cation composition $A_1$ is selected from $0.85 \leq x \leq 1$; $0 \leq z \leq 0.1$, the second cation composition $A_2$ is selected from $0.4 \leq x \leq 0.7$; $0.25 \leq y \leq 0.5$.

In one embodiment, the key processing points for the cation composition is that, the start of gradient in core-gradient periphery particles, or the change in slope for multi-slope cathode particles can occur at any time during the particle process.

In one embodiment, the full-gradient shell initiates the concentration gradient when $B_1$ starts to be switched to $B_2$. In another embodiment, the slope change for multi-slope gradient particles undergoes the change when $B_1$ equals $B_2$.

The stream ($e_i \ldots z_i$) includes additional solvents, surface acting agents or de-foaming agents. For example, the solvent is at least one selected from ethanol, isopropanol, ionic liquids and so on. The surface acting agents may be alkyl sulfates such as sodium dodecyl sulfate (SDS), alkyl trimethyl ammonia species such as cetyltrimethyl ammonia (CTAB), glycols, glycerides. The de-foaming agent is ethanol.

In one embodiment, dopant is also fed into the reactor. The dopant refers to salts of metal elements other than Ni, Co and Mn, labeled as "Me". In one embodiment, the dopant species is $Al_2(SO_4)_3$. As a dopant element, $Al^{3+}$ would be precipitated together with other cations. In such embodiment, $Al^{3+}$ can be added to the cathode particle precursor during co-precipitation without using an additional chelating additive to slow the precipitation kinetics. Further, in such embodiment, the cathode particle precursor is Ni-rich material in which a ratio of Ni/transitional metal is larger than 0.7, and still includes the Al dopant without using an organic chelating additive. The thickness and depth of $Al^{3+}$ depositing into the particle precursor can be tailored and regulated based on the time when the anions start to be gradually switched and the time when feeding $Al^{3+}$ thereinto.

The precipitation zone agitated vessel is well mixed during the feeding, and has a Re>6,400, with a mixing time from 0 to 1,200 seconds. In one embodiment, the mixing time is 0 to 120 seconds. In another embodiment, the mixing time is 0 to 45 seconds. The precipitation zone temperature is maintained between 30 and 80° C. In one embodiment, the precipitation zone temperature is maintained between 45 and 60° C.

The inventor notes that solids with different cation anion pairings have different equilibrium solubilities, as is tested by the solubility product, $K_{sp}$. During precipitation, the $K_{sp}$ value is the thermodynamic limit of metal ions precipitating out of solution, with different anions and pH having an influence. By adjusting the solution pH and anion, the precipitation is possible and the stability of said cations in the solid form is adjusted, which is desirable for cathode precursor particles to better control the selection of dopants available for use during a co-precipitation reaction.

The pH of each precipitation zone is maintained at a range of 7-13. In one embodiment, the pH is at a range of 9.5-12.5 when precipitating hydroxides and at a range of 7-10 when precipitating carbonates.

In one embodiment, the pH is constant regardless of the anion species being fed for the co-precipitation. In another embodiment, the pH starts to be changed at the time when the first anion composition $B_1$ starts to be gradually switched to the second anion composition $B_2$.

Table 1 shows the solubility product constant ($K_{sp}$) of carbonate and hydroxide materials. As can be seen from table 1 that the solubility product constant ($K_{sp}$) of carbonate is larger than that of hydroxide. Theoretically, more hydroxide materials precipitate than the carbonate materials under the same pH. The $K_{sp}$ and pH are usually two main factors determining the solubility of a substance. In table 1, "(II)" means a valence of the metal element in the precipitation is divalent.

TABLE 1

Solubility Product Constants near 25° C.

| Ionic Compound | $K_{sp}$ | Ionic Compound | $K_{sp}$ |
|---|---|---|---|
| Aluminum hydroxide | $1.3 \times 10^{-33}$ | Aluminum carbonate (not stable) | N/A |
| Cobalt(II) hydroxide | $1.6 \times 10^{-15}$ | Cobalt(II) carbonate | $1.4 \times 10^{-13}$ |
| Magnesium hydroxide | $1.8 \times 10^{-11}$ | Magnesium carbonate | $3.5 \times 10^{-8}$ |
| Manganese(II) hydroxide | $1.9 \times 10^{-13}$ | Manganese(II) carbonate | $1.8 \times 10^{-11}$ |
| Nickel(II) hydroxide | $2.0 \times 10^{-15}$ | Nickel(II) carbonate | $6.6 \times 10^{-9}$ |

In another embodiment, the pH is constant regardless of the anion species being fed for the co-precipitation. In such embodiment, both the first anion composition $B_1$ and the second anion composition $B_2$ have a constant and same pH, for example, at a range of 9-10.5.

In some embodiments, the pH changes during the time period that the anion composition switches from $B_1$ to $B_2$. For example, the pH changes during the time period when hydroxide is switched to carbonate, since the first anion composition $B_1$ is hydroxide which has a pH of 10-14, and the second anion composition $B_2$ is carbonate which has a pH much lower.

In some embodiments, the pH gradually changes during the entire reaction, or for a specified duration of the reaction.

The method for forming the particle precursor further includes the following detailed steps: After sufficient time till the precipitation ends, depositing the precipitation particles from the precipitation zone to from a particle slurry.

Collecting the precipitation particle slurry in a hold-up tank or directly fed to a solid-liquid filtration device to obtain precipitated particles. The filtration device may be a plate and frame filter, candlestick filter, centrifuge, vacuum drum filter, pressure drum filter, hydrocyclone, nutsche filter, clarifier or some combination of devices.

Next, washing the filtered precipitated particles (i.e., the filter cake) to remove byproduct salts from the precipitation reactions.

And then, drying the precipitated particle slurry under vacuum at an atmosphere of $N_2$, Ar or air for 3-24 hours between 80-200° C., thus forming the precipitated particles precursor.

Once dried, the precipitated particles precursor is contacted and well mixed with a lithium source to form a mixture. The lithium source is selected from lithium hydroxide (i.e., LiOH), $LiOH \cdot H_2O$, lithium carbonate ($Li_2CO_3$), $LiNO_3$, lithium acetate, lithium metal or $Li_2O$. In one embodiment, the lithium source is lithium hydroxide. In another embodiment, the lithium source is lithium carbonate.

In one embodiment, a mole ratio between Li from the lithium source and the metal cation from stream (a) is in a range of 0.5-1.5. In another embodiment, the mole ratio is 0.9-1.15. In still another embodiment, the mole ratio is 1.01-1.10.

After the lithium source and the precipitated particles precursor are mixed uniformly to form a mixture, calcining the mixture under a temperature of 300-950° C., wherein multiple hold temperatures and ramp rates may be used. For example, firstly controlling the temperature at 300-500° C. for 2-20 hours, and then raising temperature to 700-850° C. and maintaining for 2-20 hours. The ramp rate during heating is from 0.5 to 10 degrees per minute. In another embodiment, the ramp rate during heating is 2-5 degrees per minute. The calcination time is from 2 hours to 48 hours.

During calcination in the method above, water may generate between 0-800° C. during the calcining step. Since during calcination, the precursors underwent decomposition and/or oxidation to yield the expected products, the cathode active particles. During the calcining step, the following reaction occurred based on formulas 1-3, wherein $M(OH)_2$, $M(CO_3)$ and $M(C_2O_4)$ may be one of the precipitated particles from the solution, M refers to metals:

$M(OH)_2 = MO_x + H_2O$     (formula 1)

$M(CO_3) = MO_x + CO/CO_2$     (formula 2)

$M(C_2O_4) = MO_x + CO/CO_2$     (formula 3).

Tables 2 and 3 show moles of water evolved from calcination of 1 mol of $M(OH)_2/MCO_3$ precursor (i.e., lithiation process) when using different lithium source. We can get that while the exact water release is complicated by the choice of lithium source, it is apparent that hydroxide precursor particles will generate water while carbonate and oxalate anion presence will result in some carbon-oxide species.

The content of water evolved from the cathode particle precursor and Li precursor will be decreased when an anion composition gradient material is prepared, because $CO/CO_2$ will be evolved partially during the decomposition reactions instead of $H_2O$, just as formulas 2 and 3 show.

The calcination is conducted under atmosphere selected from $N_2$, air, dried air, oxygen or some combination thereof. The calcination temperature is critical for concentration gradient materials, since too high, too long, or a combo of the two may cause so much cation diffusion that a gradient is no longer present in the final cathode active particles.

To characterize and analysis the precipitated cathode active particles which have concentration gradient elements, SEM, porosimetry, pycnometer and particle size distributions can be utilized. The presence of a concentration gradient can be confirmed by depth profiling a particle or via cross-sectioning a particle and using an EDS line scan or electron microprobe analyzer.

The precipitated and cathode active particles can be characterized using the particle size distribution D10, D50, D90 or the Sauter mean diameter $d_{32}$. The Sauter mean diameter $d_{32}$ can be calculated by the formula $$d_{32} = \frac{\sum_{k=1}^{N} n_k d_k^3}{\sum_{k=1}^{N} n_k d_k^2},$$

wherein "$n_k$" is the relative fraction and "$d_k$" is the bin diameter from the particle size distribution. The particle size distribution can be collected via a light scattering instrument. In one embodiment, the prepared cathode active

TABLE 2

Moles of water evolved from calcination of 1 mol
$M(OH)_2/MCO_3$ precursor when the lithium source is $LiOH \cdot H_2O$

| 1 mol cathode precursor | $M(OH)_2$ | $MCO_3$ | $M(OH)_2/MCO_3$ (1:1) | $M(OH)_2/MCO_3$ (1:1) | $M(OH)_2/MCO_3$ (1:1) | $M(OH)_2/MCO_3$ (1:1) |
|---|---|---|---|---|---|---|
| lithiation | | | Water evolved from calcination (mol) | | | |
| 90% | 2.25 mol | 1.35 mol | 1.80 mol | 1.95 mol | 2.03 mol | 2.07 mol |
| 100% | 2.50 mol | 1.50 mol | 2.00 mol | 2.17 mol | 2.25 mol | 2.30 mol |
| 103% | 2.58 mol | 1.55 mol | 2.06 mol | 2.23 mol | 2.32 mol | 2.37 mol |
| 110% | 2.75 mol | 1.65 mol | 2.20 mol | 2.38 mol | 2.48 mol | 2.53 mol |
| 120% | 3.00 mol | 1.80 mol | 2.40 mol | 2.60 mol | 2.70 mol | 2.76 mol |
| 130% | 3.25 mol | 1.95 mol | 2.60 mol | 2.82 mol | 2.93 mol | 2.99 mol |

TABLE 3

Moles of water evolved from calcination of 1 mol
$M(OH)_2/MCO_3$ precursor when the lithium source is $Li_2CO_3$

| 1 mol cathode precursor | $M(OH)_2$ | $MCO_3$ | $M(OH)_2/MCO_3$ (1:1) | $M(OH)_2/MCO_3$ (1:1) | $M(OH)_2/MCO_3$ (1:1) | $M(OH)_2/MCO_3$ (1:1) |
|---|---|---|---|---|---|---|
| lithiation | | | Water evolved from calcination (mol) | | | |
| 90% | 0.90 mol | 0.00 mol | 0.45 mol | 0.60 mol | 0.68 mol | 0.72 mol |
| 100% | 1.00 mol | 0.00 mol | 0.50 mol | 0.67 mol | 0.75 mol | 0.80 mol |
| 103% | 1.03 mol | 0.00 mol | 0.52 mol | 0.69 mol | 0.77 mol | 0.82 mol |
| 110% | 1.10 mol | 0.00 mol | 0.55 mol | 0.73 mol | 0.83 mol | 0.88 mol |
| 120% | 1.20 mol | 0.00 mol | 0.60 mol | 0.80 mol | 0.90 mol | 0.96 mol |
| 130% | 1.30 mol | 0.00 mol | 0.65 mol | 0.87 mol | 0.98 mol | 1.04 mol | particles have a Sauter mean diameter at a range of 0.5-30 µm. In another embodiment, the Sauter mean diameter is at a range of 1-15 µm.

The porosity of the prepared cathode active particles can be analyzed using BET and BJH analysis.

The prepared cathode active particles can be used in lithium-ion battery, in which the prepared cathode active particles include Li and transitional metals. In detail, in one embodiment, the prepared cathode active particles are mixed with a binder and conductive particles to form a mixture slurry. The mixture slurry is further cast onto a metallic foil to form a cathode electrode. The cathode electrode can be used in a lithium-ion battery.

To test the cathode material performance, galvanotactic charge-discharge tests can be performed. The material capacity, cycle retention, rate performance and cycle efficiency can all then be determined.

Embodiment 1

FIG. 1 shows a schematic view of the reaction device to form the cathode active particles. As shown in FIG. 1, the reaction is conducted with the following steps: Feeding 3 L of 0.5M aqua ammonia into a 10 L glass, jacketed stirred tank reactor, and stirring at 500 rpm. At the same time, sparging $N_2$ gas through the solution to remove oxygen from the water and headspace, and heating the solution to 50° C. via circulating hot water through the jacket. Meanwhile, in order to control the pH, communicating a 10.6M NaOH solution into the reactor with a pH controller with at set-point originally set at 9.

At the start of reaction, preparing two 0.65 L cation solutions of metal sulfate, one is 2M Ni:Mn:Co 6:2:2, the other is 2M Ni:Co 90:10. And preparing two anion solutions, one is 0.9 L 1.5M $Na_2CO_3$, the other is 0.9 L 3M NaOH.

Feeding the first cation solution, i.e., 2M Ni:Co 90:10 metal sulfate solution into the reactor which is previously loaded in a beaker. Simultaneously, gradually pumping a second cation solution of 2M Ni:Mn:Co 6:2:2 metal sulfate at 62.5 mL/hr into the beaker that was initially filled with a first cation solution, i.e., 2M Ni:Co 90:10 metal sulfate solution.

At the same time, feeding 0.9 L 3M NaOH solution, and simultaneously pumping the 0.9 L 1.5M $Na_2CO_3$ at a rate of 0.5 mL/min into the 0.9 L 3M NaOH solution and mixing both.

Pumping the dynamic mixed NaOH/$Na_2CO_3$ solution into the reactor at 1 mL/min. As the reaction proceeded the pH set-point was decreased by 0.2 from the starting value at ⅕ intervals of the total reaction time.

After the reaction, the reactor slurry was filtered and washed with copious amounts of DI water. The filter cake was dried at 100 deg C under nitrogen overnight, thus yielding the particle precursor as shown in FIG. 4. After that, making characterizations to the particle precursor.

Embodiment 2

The reaction conditions were the same as embodiment 1, the difference between Embodiments 2 and 1 lies in that the first cation solution 2M Ni:Mn:Co 71:15:14 metal sulfate is initially present in the beaker at the start of reaction, and a second cation solution including both a 0.04M aluminum sulfate and a 2M Ni:Mn:Co 71:15:14 metal sulfate is gradually fed into the first cation solution originally present in the baker.

Particle Characterization:

To verify the particle structure a Hitachi SU8010 SEM that is able to use a focused ion beam to cross section the particles was used to study the particle structure. After cross section EDS was used to determine the relative locations of elements within the sample particles studied. Spot scans using EDS have a resolution of 1 µm.

Figure 7:
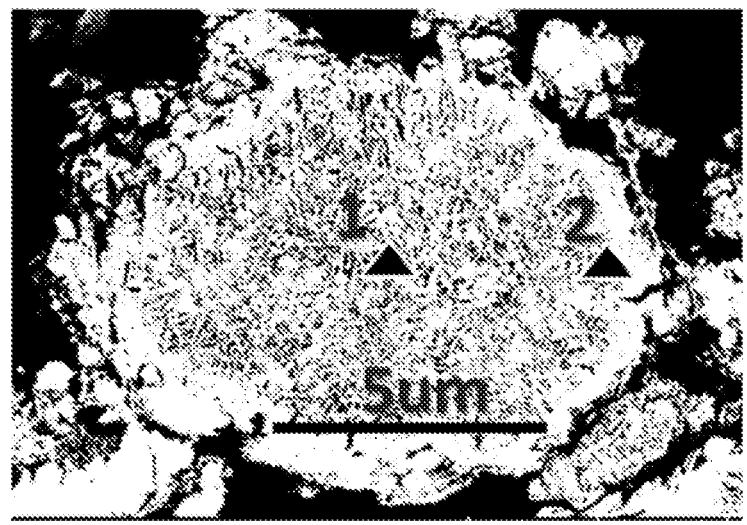
FIG. 7 shows SEM photo of cross sectional particle precursor prepared in Example 1.
Figure 9:
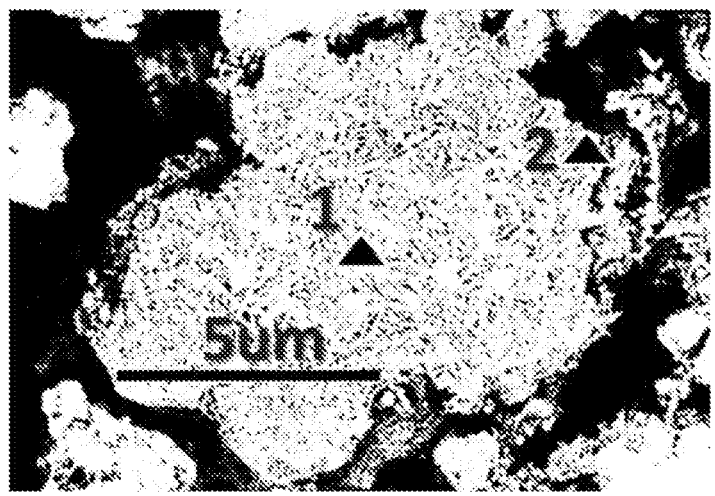
FIG. 9 shows SEM photo of cross sectional particle precursor prepared in Example 2.

FIG. 7 shows a SEM image of cross-sectional particle precursor in Embodiment 1, the triangles 1 and 2 represent the location where EDS spot analysis is conducted. FIG. 9 shows another SEM image of cross-sectional particle precursor in Embodiment 2, the triangles 1 and 2 have the same meaning with that in FIG. 7. Table 1 shows the EDS spot analysis results at points 1 and 2 in the SEM images of Embodiments 1 and 2. In table 4, the relative content of Ni:Mn:Co:Al is calculated from the atomic % data.

TABLE 4

EDS spot analysis shown in SEM cross section images

| | Example 1 | | Example 2 | |
|---|---|---|---|---|
| | Spot 1 | Spot 2 | Spot 1 | Spot 2 |
| Ni | 0.85 | 0.74 | 0.62 | 0.59 |
| Mn | 0.05 | 0.11 | 0.20 | 0.17 |
| Co | 0.1 | 0.15 | 0.16 | 0.14 |
| Al | n/a | n/a | 0.02 | 0.10 |

As is shown in FIGS. 7 and 9, the particles all shows a uniform structure from inner to outer, with no interface present in the particles. Secondly, spot 1 locates near the center of the particle, spot 2 locates near the periphery of the particle. Table 4 shows that Al element is present both in the center and the periphery in Embodiment 2, which suggests that Al enters the co-precipitation when preparing the particle precursor by the instant method. Further, in the Ni-rich particles precursors, Al dopant enters into the particle without using organic chelating additives, as the method disclosed, this saves water.

Meanwhile, the prepared particle has a much lower content of cobalt element, which can greatly decrease the total cost.

Figure 8:
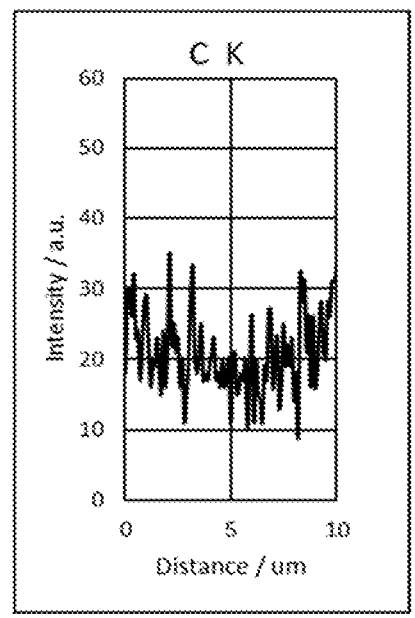
FIG. 8 shows EDS line scan results of cross sectional particle precursor from Example 1 for carbon.
Figure 10:
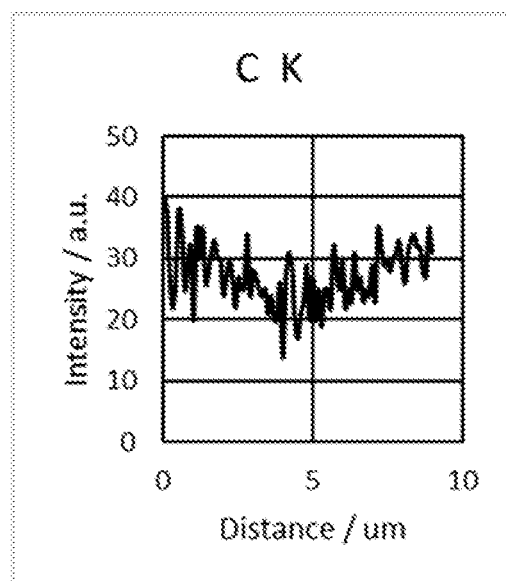
FIG. 10 shows EDS line scan results of cross sectional particle precursor for Example 2 for carbon.
Figure 11:
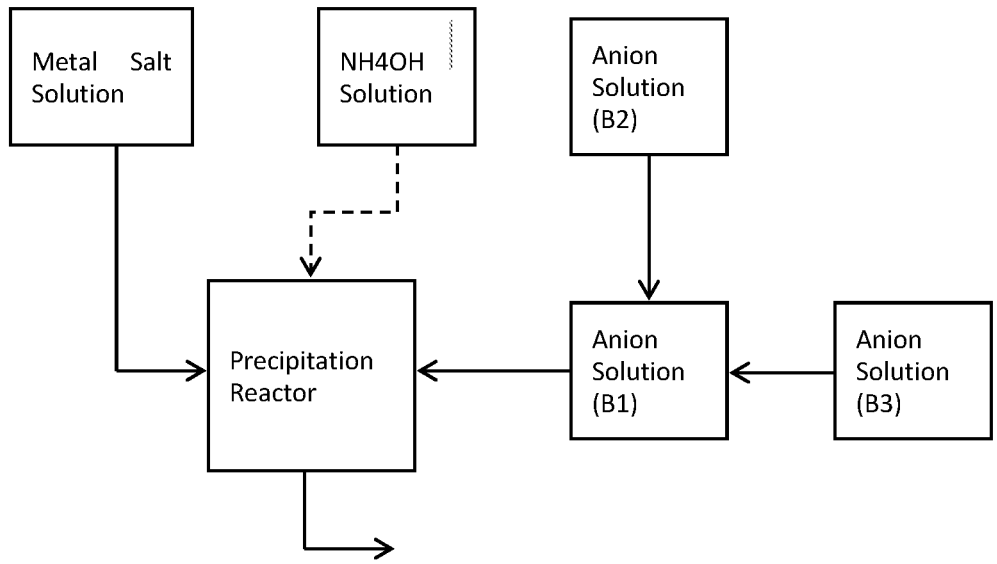
FIG. 11 shows a schematic view of the reaction device to form the full-gradient particle precursors in FIGS. 5 and/or 6 of one embodiment.
Figure 12:
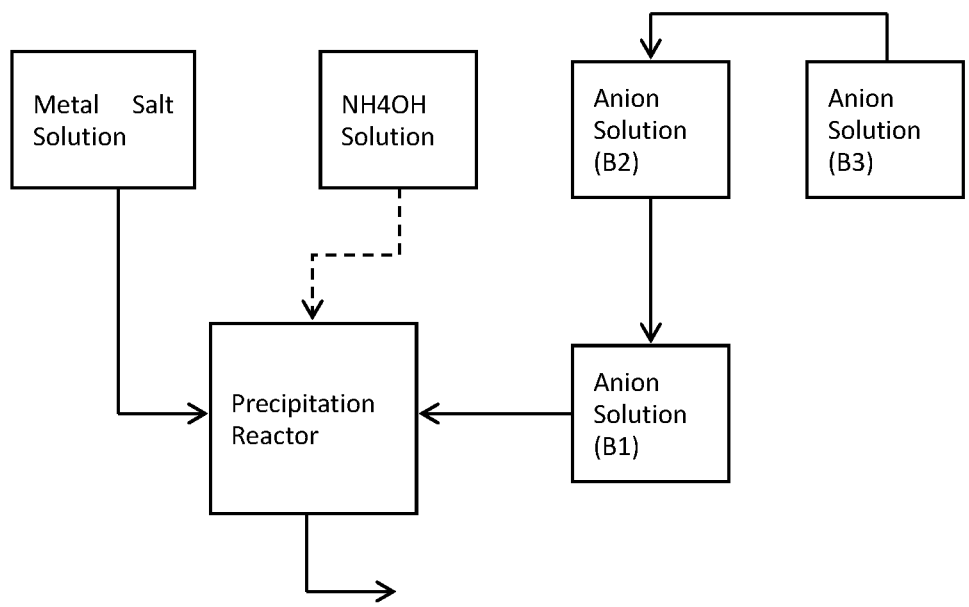
FIG. 12 shows a schematic view of the reaction device to form the full-gradient particle precursors in FIGS. 5 and/or 6 of another embodiment.

FIG. 8 shows a carbon intensity in EDS line scan result from the particle precursor in Embodiment 1. FIG. 10 shows a carbon intensity in EDS line scan result from the particle precursor in Embodiment 2. FIGS. 8 and 10 shows that during the line scans, the C intensity is low due to the low atomic weight of carbon, since the $CO_3^{2-}$ is removed by producing $CO_2$. Besides, when the distance becomes longer, the carbon intensity is gradually decreasing in both particles, which shows a trend in the gradient from inner to outer.

In view of the above, the method of the present disclosure has the following advantages:

Firstly, solids with different cation-anion pairings have different equilibrium solubilities, as is tested by the solubility constant Ksp. During precipitation, the Ksp value is the thermodynamic limit of metal ions precipitating out of solution, with different anions and pH having an influence. By adjusting the solution pH and anion, the precipitations possible and the stability of said cations in the solid form is adjusted, which is desirable for cathode precursor particles to better control the selection of dopants available for use during a co-precipitation reaction.

Hence, the transitional-metal dopants except Co, Mn, and Ni that are incompatible with the core anion species under the processing conditions can be easily added to the particle precursor in the shell, and vice versa.

Particularly, $Al^{3+}$ can be added to the particle precursor during the co-precipitation under the premise that there is hydroxide in the solution which can form precipitation with $Al^{3+}$; in such conditions, no additional organic chelating additives are needed to remove $Al^{3+}$, and the precipitation kinetics are avoided to be slowed in the absence of chelating agents. Because of this, Ni-rich particles precursor can have Al dopant into the particle without using organic chelating additives, the Ni-rich particles precursor has a mole ratio of Ni to transitional metals higher than 0.7. The concentration of $Al^{3+}$ deposited into the particles can be adjusted based on the time feeding the $Al^{3+}$ dopants and the time when switching the anions.

Secondly, since the particle precursor is full-gradient, the concentration gradient of the anion species ensures that there is smooth transition between different anion species. The transition between composition typically requires a concurrent adjustment of the pH with the reactor, the solution pH can more manageably be charged as the concentration of the anion changes.

Thirdly, due to the feeding of elements Ni, Mn, Al etc. into the reaction, the cobalt content will be below 20% of the total transition metal ratio, and preferably below 5%, and more preferably 0% cobalt will be present in the cathode precursor particle. Because of this, the cost is greatly decreased.

Fourthly, during calcination, anions of $CO_3$ or $C_2O_4$ would evolve $CO/CO_2$ gas, which makes non-homogeneous porosity within the particles. Since the concentration of the anions are gradually changed, the porosity within the particles would also be gradually increased, especially near the surface of the particles. Hence, the material may have improved transport properties during high rate electrochemical testing.

Fifthly, the content of water evolved from the cathode particle precursor and Li source will be decreased when an anion composition gradient material is prepared, because $CO/CO_2$ will be evolved partially instead of $H_2O$ during the decomposition reactions.

INDUSTRIAL APPLICABILITY

The method of the present disclosure can prepare transitional-metal particle precursor and cathode active particles under co-precipitation reaction. The particle precursor is full-gradient. Such cathode active particle can be used to prepare cathode of lithium-ion battery.

What is claimed is:

1. A method for preparing a full-gradient particle precursor, comprising the following steps:
   from an initial time $t_0$ to a first time $t_1$, feeding stream (b) into a reactor for providing anion(s), feeding stream (a) for providing cation(s), whereby the anion(s) and the cation(s) reacting to form a precipitated particle slurry; the stream (a) comprises at least a first cation composition $A_1$, the stream (b) comprises at least a first anion composition $B_1$ and a second anion composition $B_2$, which is different from the first anion composition $B_1$, the first anion composition $B_1$ is gradually switched to the second anion composition $B_2$ from the initial time $t_0$ to the first time $t_1$, $t_1$ comes after $t_0$, $t_0=0$;
   filtering precipitated particle slurry to obtain a precipitated particle, and drying the precipitated particle to yield the full-gradient particle precursor;
   the anion(s) provided by the stream (b) is at least one selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, and $K_2C_2O_4$,
   the cation(s) provided by the stream (a) is at least one selected from the group consisting of Mg, Ca, Zr, Ti, V, Cr, Mn, Fe, Co, Ni, Cu, and Al, in a form of sulfate, carbonate, chloride, nitrate, fluoride, oxide, hydroxide, oxyhydroxide, oxalate, carboxylate, acetate, phosphate or borate.

2. The method of claim 1, wherein the stream (b) comprises anions whose concentration is 0.001-14 mol anion/L; and/or the stream (a) comprises cations whose concentration is 0.001-6 mol cation/L.

3. The method of claim 1, wherein the first anion composition $B_1$ is hydroxide salts, the second anion composition $B_2$ is at least one selected from the group consisting of carbonate, oxalate, and hydroxide.

4. The method of claim 1, wherein the stream (a) comprises only one cation composition $A_1$, and a flowrate or concentration of the cation composition $A_1$ is constant from the initial time $t_0$ to the first time $t_1$.

5. The method of claim 1, wherein the stream (a) further comprises a second cation composition $A_2$, the first cation composition $A_1$ is abruptly switched to the second cation composition $A_2$ at a switching time $t_s$, in which $t_s$ is between the initial time to and the first time $t_1$.

6. The method of claim 1, wherein the stream (a) further comprises a second cation composition $A_2$, the first cation composition $A_1$ is gradually switched to the second cation composition $A_2$ from the initial time $t_0$ to the first time $t_1$.

7. The method of claim 6, wherein the first cation composition $A_1$ and the second cation composition $A_2$ has a cation ratio of $Ni_xMn_yCo_zMe_{1-x-y-z}$, where $x+y+z\geq0.9$, $z\leq0.2$, "Me" is at least one additional metal elements selected from the group consisting of Mg, Ca, Zr, Ti, V, Cr, Fe, Cu and Al.

8. The method of claim 1, wherein the stream (b) further comprises a third anion composition $B_3$, which is at least one selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, and $K_2C_2O_4$; at the first time $t_1$, $B_3$ begins flowing into the process;
the method further comprising the following steps:
   feeding the second anion composition $B_2$ and the third anion composition $B_3$ through a container, into the reactor from the first time $t_1$ to a second time $t_2$, $t_2$ comes after $t_1$, the second anion composition $B_2$ and the third anion composition $B_3$ form a dynamic anion composition, the dynamic anion composition is gradually switched to the third anion composition $B_3$ from the first time $t_1$ to the second time $t_2$;
   feeding the stream (a) for providing cation(s) simultaneously from the first time $t_1$ to the second time $t_2$, the stream (a) comprises at least the first cation composition $A_1$.

9. The method of claim 8, wherein the stream (a) further comprises a second cation composition ($A_2$), the method further comprises the following step: feeding the first cation composition $A_1$ and the second cation composition $A_2$ from the first time $t_1$ to the second time $t_2$, during which the first cation composition $A_1$ is gradually switched to the second cation composition $A_2$.

10. The method of claim 1, wherein a pH during the reaction is 7-13 which is gradually changed, the pH is 9.5-12.5 when precipitating hydroxides, the pH is 7-10 when precipitating carbonates; and/or a temperature during the reaction is 30-80° C.

11. A full-gradient particle precursor as prepared by the method of claim 1, wherein the particle precursor has a formula $(Ni_xMn_yCo_zMe_{1-x-y-z})(CO_3)_a(OH)_{2-2a}$ where $x+y+z \geq 0.9$, $z \leq 0.2$, $0 \leq a \leq 1$, Me is at least one additional metal element selected from the group consisting of Mg, Ca, Zr, Ti, V, Cr, Fe, Cu and Al;
   the particle precursor comprises a first gradient part, which is made of co-precipitation of anions comprising a first anion composition $B_1$ and a second anion composition $B_2$ and cation(s) comprising at least a first cation composition $A_1$, the first anion composition $B_1$ is gradually switched to the second anion composition $B_2$ from inner to outer, and the first anion composition $B_1$ is different from the second anion composition $B_2$.

12. The full-gradient particle precursor of claim 11, wherein the cation(s) further comprises a second cation composition $A_2$, the first gradient part is divided into a center part and a periphery part enwrapping the center part, the center part comprises the first cation composition $A_1$, the periphery part comprises mainly the second cation composition $A_2$.

13. The full-gradient particle precursor of claim 11, wherein the cation(s) in the first gradient part further comprises a second cation composition $A_2$, the first cation composition $A_1$ is gradually switched to the second cation composition $A_2$ within the first full-gradient part from inner to outer.

14. The full-gradient particle precursor of claim 11, wherein the full-gradient particle precursor further comprises a second gradient part enwrapping the first gradient part, the second gradient part is made of co-precipitation of anions comprising the second anion $B_2$ and a third anion $B_3$, or the second gradient part is made of co-precipitation of anions comprising the first anion $B_1$, the second anion $B_2$ and a third anion $B_3$;
   and cation(s) comprising at least the first cation composition $A_1$, in which the second anion composition $B_2$ is gradually switched to the third anion $B_3$;
   the second gradient part further comprises a second cation composition $A_2$, the first cation composition $A_1$ is gradually switched to the second cation composition $A_2$ within the second gradient part from inner to outer.

15. The method of claim 1, wherein feeding stream (b) comprises the following steps:
   firstly, loading all the first anion composition $B_1$ into a container, which is connected with the reactor; secondly, starting to feed the second anion composition $B_2$ into the container with certain flowrate from the initial time $t_0$, and the first anion composition $B_1$ and the second anion composition $B_2$ forming a dynamic mixture solution, feeding the dynamic mixture solution into the reactor through the container from the initial time to to a first time $t_1$, at the initial time to, the dynamic mixture fed into the reactor is mainly the first anion composition $B_1$, while at the first time $t_1$, the dynamic mixture is mainly the second anion composition $B_2$.

16. The method of claim 3, wherein a content of hydroxide in the stream (b) is no less than 80 wt %, a content of carbonate anion and/or oxalate anion is no less than 40 wt %.

17. The method of claim 6, wherein the step that the first cation composition $A_1$ is gradually switched to the second cation composition $A_2$ from the initial time $t_0$ to the first time $t_1$ comprises the following steps:
   firstly, loading all the first cation composition $A_1$ into a container;
   and then, starting to feed the second cation composition $A_2$ into the container at a certain flowrate from the initial time to to form a dynamic mixture; and
   feeding the dynamic mixture into the reactor through the container from the initial time $t_0$ to the first time $t_1$, the dynamic mixture is mainly the first cation composition $A_1$ at the initial time $t_0$, mainly the second cation composition $A_2$ at the first time $t_1$.

18. The method of claim 7, wherein the first cation composition Ai has a cation ratio of $Ni_xMn_yCo_zMe_{1-x-y-z}$, where $x+y+z \geq 0.9$, $0.75 \leq x \leq 1$; $0 \leq z \leq 0.1$; and/or the second cation composition $A_2$ has a cation ratio of $Ni_xMn_yCo_zMe_{1-x-y-z}$, where $x+y+z \geq 0.9$, $0.3 \leq x \leq 0.7$; $0.25 \leq y \leq 0.5$, Me is at least one additional metal elements selected from the group consisting of Mg, Ca, Zr, Ti, V, Cr, Fe, Cu and Al.

19. The method of claim 8, wherein the step that the second anion composition $B_2$ is gradually switched to the third anion composition $B_3$ from the first time $t_1$ to the second time $t_2$ comprises the following steps:
   starting to feed the third anion composition $B_3$ into the container with certain flowrate from the first time $t_1$, the second anion composition $B_2$ and the third anion composition $B_3$ forming a dynamic mixture solution, or the first anion composition $B_1$, the second anion composition $B_2$ and the third anion composition $B_3$ forming a dynamic mixture solution;
   feeding the dynamic mixture solution into the reactor through the container from the first time $t_1$ to a second time $t_2$, at the first time $t_1$, the dynamic mixture fed into the reactor is mainly the second anion composition $B_2$, while at the second time $t_2$, the dynamic mixture is mainly the third anion composition $B_3$.

20. The method of claim 9, wherein a container for the stream (a) is filled with the first cation composition Ai at the first time ti, the step the first cation composition $A_1$ is gradually switched to the second cation composition $A_2$ comprises the following steps:
   starting to feed the second cation composition $A_2$ into the container for the stream (a) with certain flowrate from the first time $t_1$, the first cation composition $A_1$ and the second cation composition $A_2$ forming a dynamic mixture solution; and
   feeding the dynamic mixture solution into the reactor through the container for the stream (a) from the first time $t_1$ to a second time $t_2$, at the first time $t_1$, the dynamic mixture fed into the reactor is mainly the first cation composition $A_1$, while at the second time $t_2$, the dynamic mixture is mainly the second cation composition $A_2$.

* * * * *